(12) United States Patent
Muntu et al.

(10) Patent No.: US 8,960,813 B2
(45) Date of Patent: Feb. 24, 2015

(54) METHOD AND BRAKE SYSTEM FOR CONTROLLING THE DRIVING STABILITY OF A VEHICLE

(75) Inventors: Matthias Muntu, Hofheim (DE); Volker Bremeier, Altheim (DE)

(73) Assignee: Continental Teves AG & Co. oHG (DE)

( * ) Notice: Subject to any disclaimer, the term of this patent is extended or adjusted under 35 U.S.C. 154(b) by 290 days.

(21) Appl. No.: 13/515,899

(22) PCT Filed: Dec. 17, 2010

(86) PCT No.: PCT/EP2010/070130
§ 371 (c)(1),
(2), (4) Date: Oct. 25, 2012

(87) PCT Pub. No.: WO2011/073415
PCT Pub. Date: Jun. 23, 2011

(65) Prior Publication Data
US 2013/0062930 A1    Mar. 14, 2013

(30) Foreign Application Priority Data
Dec. 17, 2009   (DE) .................. 10 2009 058 721

(51) Int. Cl.
*B60T 8/66* (2006.01)
*B60T 8/1755* (2006.01)
*B60T 8/1766* (2006.01)
*B60T 13/58* (2006.01)
*B60T 13/66* (2006.01)

(52) U.S. Cl.
CPC .......... *B60T 8/1755* (2013.01); *B60T 8/17555* (2013.01); *B60T 8/1766* (2013.01); *B60T 13/586* (2013.01); *B60T 13/66* (2013.01); *B60T 2270/608* (2013.01); *B60T 2270/613* (2013.01)

USPC ............................... 303/146; 303/142

(58) Field of Classification Search
USPC .................. 303/140, 142, 146, 155
See application file for complete search history.

(56) References Cited

U.S. PATENT DOCUMENTS

| 6,085,860 A * | 7/2000 | Hackl et al. .................. 180/443 |
| 6,572,202 B2 * | 6/2003 | Watanabe ..................... 303/167 |
| 2003/0230933 A1 | 12/2003 | Schneider |
| 2004/0176899 A1 * | 9/2004 | Hallowell ........................ 701/84 |
| 2006/0125313 A1 * | 6/2006 | Gunne et al. ...................... 303/7 |
| 2009/0228181 A1 * | 9/2009 | Luders et al. .................... 701/67 |
| 2009/0302673 A1 * | 12/2009 | Linhoff ............................ 303/3 |

FOREIGN PATENT DOCUMENTS

| CN | 101380946 | 3/2009 |
| WO | WO-2009077835 A1 | 6/2009 |

OTHER PUBLICATIONS

International Application Serial No. PCT/EP2010/070130, International Search Report mailed Mar. 31, 2011, 4 pgs.
Chinese Office Action corresponding Chinese Patent Application No. 201080057448.7, dated Mar. 5, 2014 (English translation only).

\* cited by examiner (Continued)

*Primary Examiner* — Christopher Schwartz
(74) *Attorney, Agent, or Firm* — RatnerPrestia

(57) ABSTRACT

The invention relates to a method in which the driving stability of a vehicle is controlled, wherein a yaw rate difference is influenced by an additional yaw moment which is generated at least partially by building up braking torque independently of the driver at one or more wheels. According to the invention, the braking torque which influences the additional yaw moment is variably apportioned between the front axle and the rear axle of the vehicle in an oversteering situation.

13 Claims, 3 Drawing Sheets

METHOD AND BRAKE SYSTEM FOR CONTROLLING THE DRIVING STABILITY OF A VEHICLE

CROSS REFERENCE TO RELATED APPLICATIONS

This application is the U.S. National Phase Application of PCT/EP2010/070130, filed Dec. 17, 2010, which claims priority to German Patent Application No. 10 2009 058 721.7, filed Dec. 17, 2009, the contents of such applications being incorporated by reference herein.

FIELD OF THE INVENTION

The invention relates to a method for controlling the driving stability of a vehicle wherein a yaw rate difference is influenced by means of an additional yaw moment which is generated at least partially by building up braking torque independently of the driver at one or more wheels, and to a brake system for a motor vehicle which preferably has hydraulic friction brakes at the wheels of at least one axle.

BACKGROUND OF THE INVENTION

When the driving stability of a vehicle is being controlled, the driving behavior of a vehicle is influenced in such a way that the driver can maintain better control of the vehicle in critical situations. A critical situation is here an unstable driving state in which in an extreme case the vehicle does not follow the driver's prescriptions. The function of driving stability control is therefore to cause the vehicle to adopt the driving behavior desired by the driver within the physical limits in such situations.

The term driving stability control can be used to cover multiple principles for influencing the driving behavior of a vehicle by means of predefinable braking torques at individual wheel brakes and by intervening in the engine management system of the drive engine. This involves an anti-slip brake system (ABS), which is intended to prevent individual wheels locking during a braking process, a traction control system (TCS) which prevents the driven wheels from spinning, an electronic braking force distribution system (EBFDS), which controls the ratio of the braking forces between the front axle and rear axle of the vehicle, a tilt control system (ARP) which prevents the vehicle from tilting about its longitudinal axis, and a yaw moment control system (ESC), which ensures that there are stable driving states when the vehicle yaws about the vertical axis. During yaw moment control, an additional yaw moment is built up, by selectively braking individual wheels, in order to reduce the yaw rate difference between the measured actual yaw rate and the setpoint yaw rate which is determined on the basis of a vehicle model, wherein the slip angle is frequently also controlled.

Previously known systems for controlling the driving stability of a vehicle provide for fixed distribution of the stabilizing additional yaw moment about the vertical axis between the front and rear axles during an oversteering situation, wherein a braking torque is generated mainly at the front axle. The asymmetrical braking torque at one wheel of the front axle can lead here to an undesired reaction on the steering.

In vehicles with a hydraulic brake system, braking torque is built up independently of the driver by actuating a hydraulic pump and suitably actuating solenoid values. This has the disadvantage that noise which disturbs the driver is produced.

SUMMARY OF THE INVENTION

The invention is based on the aim of making available a driving stability control means which is more convenient for the driver.

This is achieved according to aspects of the invention by means of a method wherein a yaw rate difference is influenced by means of an additional yaw moment which is generated at least partially by building up braking torque independently of the driver at one or more wheels, wherein the braking torque which influences the additional yaw moment is variably apportioned between the front axle and the rear axle of the vehicle in oversteering situations, and to a brake system for a motor vehicle which preferably has hydraulic friction brakes at the wheels of at least one axle.

A method is therefore made available in which the driving stability of a vehicle is controlled, wherein a yaw rate difference is influenced by means of an additional yaw moment which is generated at least partially by building up braking torque independently of the driver at one or more wheels, wherein the braking torque which influences the additional yaw moment is variably apportioned between the front axle and the rear axle of the vehicle in oversteering situations. In this context the driving stability is expediently detected using the ESC sensor system which is present. If the braking torque can be built up completely at the rear axle, any steering reactions of the braking intervention are completely eliminated. On the other hand, they are attenuated making the driving stability control more comfortable for the driver.

In vehicles having an electric brake system or an electrically activated brake system at the rear axle and a hydraulic brake system at the front axle, a gain in comfort is achieved by bringing about a driver-independent buildup of braking torque and an active buildup of longitudinal force at the rear axle without the disruptive noise of a hydraulic pump.

In vehicles which have an electric drive at the rear axle, preferably wheel hub motors, an active buildup of longitudinal force can also occur by means of the drag torque of an electric drive in the generator mode.

A fixed apportionment of the braking torque between the front and rear axles of the vehicle is preferably selected if the change in the yaw rate difference over time exceeds a predefined threshold value. Owing to the rapid change over time it is to be expected that braking interventions are necessary which would cause overbraking of the rear axle or intervention of a slip controller in order to monitor the longitudinal force, which would result in a time lag in the yaw moment control as a result of the transfer of the braking torque from the rear axle to the front axle. This time delay is avoided by selecting a fixed apportionment between the front and rear axles, which is optimized from the point of view of stability criteria.

The portion of the braking torque at the rear axle of the vehicle is preferably selected as a function of the magnitude of the yaw rate difference. Depending on the magnitude of the required additional yaw moment, braking torques could otherwise be requested at the rear axle, which braking torques would lead, without intervention of a slip controller, to loss of driving stability.

A fixed apportionment of the braking torque between the front and rear axles of the vehicle is particularly preferably selected if the yaw rate difference exceeds a predefined first threshold value. If the braking torque is distributed between the front and rear axles according to a fixed distribution which is suitable from the point of view of stability criteria, strong braking interventions are also possible without loss of adhesion between the tire and the underlying surface.

Braking torque is particularly preferably requested only at the rear axle if the yaw rate difference undershoots a predefined second threshold value. As a result, a relatively high level of driving comfort is achieved for a certain range of yaw rate differences.

In particular, the portion of braking torque which is requested at the rear axle is reduced in proportion to the amount by which the yaw rate difference exceeds the second threshold value. This ensures a gentle transition between a comfort-oriented braking torque distribution and a stability-oriented braking torque distribution.

The braking torque which is actually built up at the rear axle is expediently monitored. As a result, it is possible to detect if, for example, owing to a slip controller intervention, less braking torque has been built up than corresponds to the requirement.

It is particularly expedient to request a braking torque at the front axle if the difference between the requested braking torque and the actually built-up braking torque at the rear axle exceeds a predefined threshold value.

It is quite particularly expedient if the braking torque at the front axle is selected in accordance with the difference between the requested braking torque and the actually built-up braking torque at the rear axle. This ensures the fastest possible reduction in the difference between the setpoint yaw rate and the actual yaw rate.

The invention also relates to a brake system for a motor vehicle which preferably has hydraulic friction brakes at the wheels of at least one axle, wherein a control unit of the brake system carries out a method as claimed in at least one of the preceding claims.

According to one preferred embodiment of the invention, the brake system has hydraulic friction brakes at the wheels of the front axle and electromechanical friction brakes at the wheels of the rear axle. A yaw moment control can therefore take place in favorable cases without activation of a hydraulic pump which can be heard by the driver.

The invention also relates to the use of a brake system according to aspects of the invention in a vehicle which has an electric drive at least at the wheels of the rear axle, in particular wheel hub motors, wherein the torque of the electric drive can be distributed separately to the rear wheels, and the braking torque at the rear axle is built up at least partially by the electric drive in the generator mode. This permits both recovery of the braking energy and comfortable yaw moment control. In this context wheel hub motors are particularly preferably used since they have a low moment of inertia and therefore permit particularly rapid reaction.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
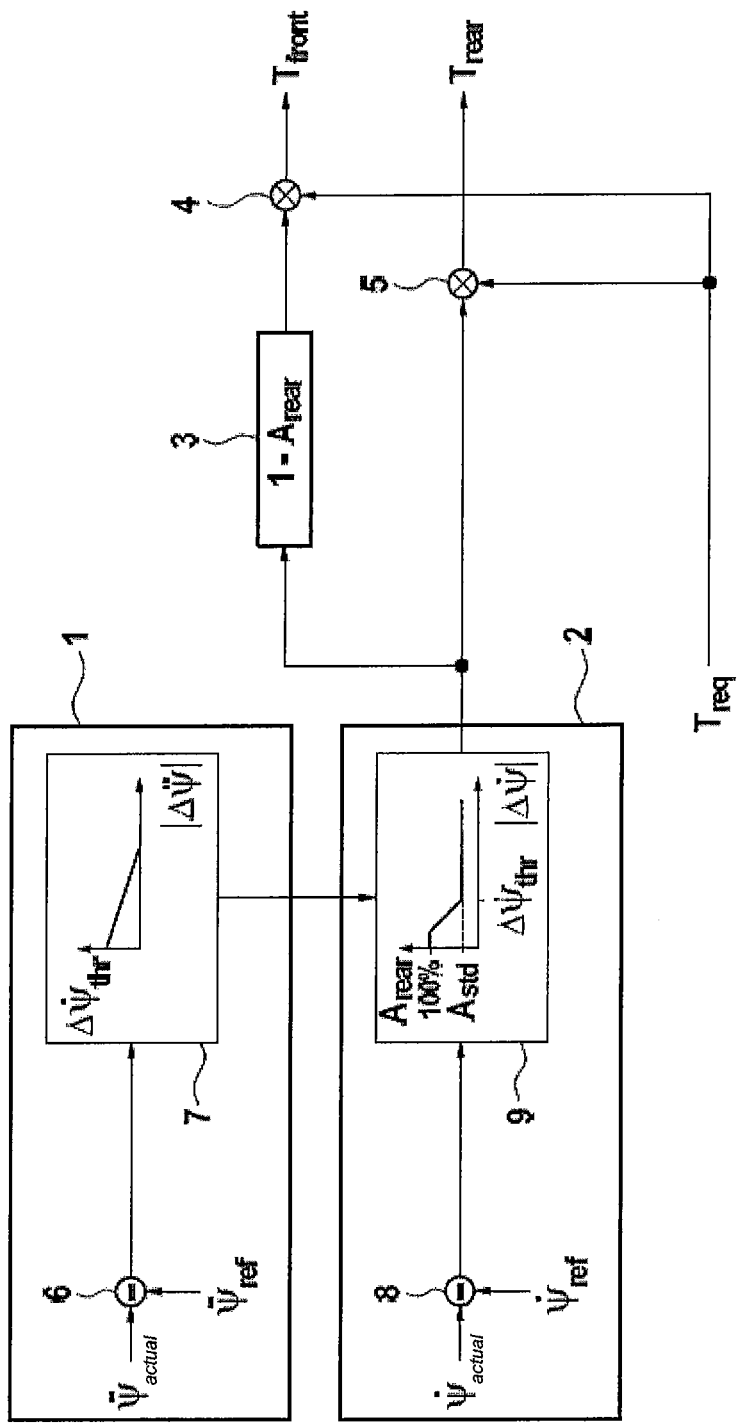
FIG. 1 shows a block diagram for determining the requested braking torque.

FIG. 1 shows a block diagram for determining the requested braking torques. In block 1, a threshold value for the yaw rate difference $\Delta\dot{\Psi}_{thr}$ is determined as a function of the change in the yaw rate difference $\Delta\ddot{\Psi}$ over time, wherein in the subtractor 6 the difference between the time derivative of the measured yaw rate $\Delta\ddot{\Psi}_{act}$ and the time derivative of the yaw rate $\ddot{\Psi}_{ref}$ calculated from a vehicle model is calculated, and in block 7 a functional dependence between the absolute value of the change in the yaw rate difference $|\Delta\ddot{\Psi}|$ over time and the threshold value for the yaw rate difference $\Delta\dot{\Psi}_{thr}$ is evaluated.

The threshold value for the yaw rate difference $\Delta\dot{\Psi}_{thr}$ limits the range of yaw rate differences for which a portion $A_{rear}$ of the braking torque at the rear axle which exceeds the standard portion $A_{std}$ is determined. In this context, the difference between the measured actual yaw rate $\Delta\dot{\Psi}_{act}$ and the setpoint yaw rate $\dot{\Psi}_{ref}$ determined from a vehicle model is calculated in the subtractor 8, and in block 9 a functional dependence between the absolute value of the yaw rate difference $|\Delta\dot{\Psi}|$ and the portion $A_{rear}$ of the braking torque at rear axle is evaluated.

In block 3, the portion $1-A_{rear}$ of the braking torque which has to be requested at the front axle is calculated on the basis of $A_{rear}$. In the multiplier 4, this portion is multiplied by the braking torque $T_{req}$ which is required for the buildup of a stabilizing additional yaw moment in order to determine the braking torque $T_{front}$ which is to be requested at the front axle.

The braking torque $T_{rear}$ which is to be requested at the rear axle is calculated in the multiplier 5 from the braking torque $T_{req}$ and the portion $A_{rear}$.

Figure 2:
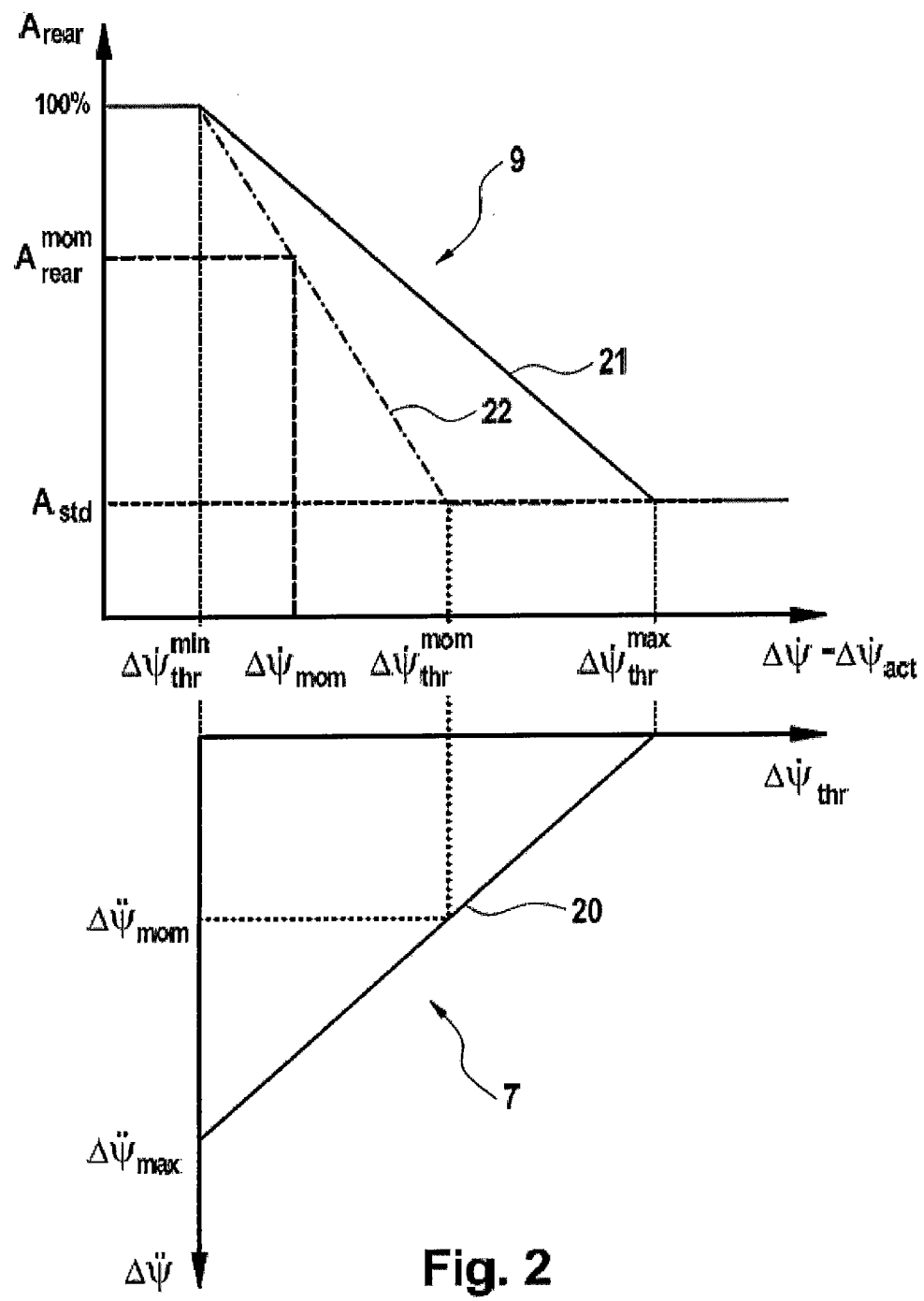
FIG. 2 shows a diagram of an exemplary embodiment of the strategy of braking torque distribution.

A preferred exemplary embodiment of the strategy according to aspects of the invention for determining a suitable braking torque distribution is illustrated in FIG. 2. Diagram 7 shows the functional dependence 20 between the change in the yaw rate difference $\Delta\ddot{\Psi}$ (or the absolute value thereof) over time and the threshold value for the yaw rate difference $\Delta\dot{\Psi}_{thr}$ in the lower, rotated coordinate system. If the change in the yaw rate difference $\Delta\ddot{\Psi}$ over time exceeds a predefined threshold value no variable distribution of the braking torque between the front and rear axles takes place, but instead a fixed ratio is selected. The percentage $A_{std}$ of the braking torque at the rear axle is then requested, said percentage being, for example, 15%. The greater portion of the braking torque is therefore requested at the front axle if the change in the yaw rate difference over time allows a high braking torque to be expected.

Otherwise, the threshold value $\Delta\dot{\Psi}_{thr}$ which forms the upper reference point for the interpolation of the portion $A_{rear}$ of the braking torque at the rear axle is selected on the basis of line 20. If the instantaneous change in the yaw rate over time is, for example, $\Delta\ddot{\Psi}_{mom}$, a variable distribution of the braking torque occurs between the front and rear axles in an interval up to the instantaneously selected threshold value $\Delta\dot{\Psi}_{thr}^{mom}$. Even in the case of a very slow change in the yaw rate difference, a threshold value of $\Delta\dot{\Psi}_{thr}^{max}$ is not exceeded here.

Diagram 9 shows the functional dependence between the portion $A_{rear}$ of the braking torque at the rear axle and the yaw rate difference $\Delta\dot{\Psi}$ (or the absolute value thereof) in the upper coordinate system. In the case of a threshold value of $\Delta\dot{\Psi}_{thr}^{max}$ for the yaw rate difference, the selection of $A_{rear}$ occurs according to line 21.

If the yaw rate difference $\Delta\dot{\Psi}-\Delta\dot{\Psi}_{act}$, reduced by the actuation threshold of the driving stability control $\Delta\dot{\Psi}_{act}$, exceeds the threshold value, the standard fixed distribution between the front and rear axles is selected.

In the case of a threshold value of $\Delta\dot{\Psi}_{thr}^{mom}$, selected on the basis of diagram 7, the distribution of the braking torque occurs according to line 22. If the instantaneous yaw rate difference is, for example, $\Delta\dot{\Psi}_{mom}$, the portion $A_{rear}^{mom}$ of the braking torque at the rear axle is requested. If the instantaneous yaw rate difference undershoots a threshold value of $\Delta\dot{\Psi}_{thr}^{min}$ braking torque is requested only at the rear axle, in order to permit particularly comfortable control.

The illustrated functional dependencies can be modified in order to avoid numerical instabilities.

Figure 3:
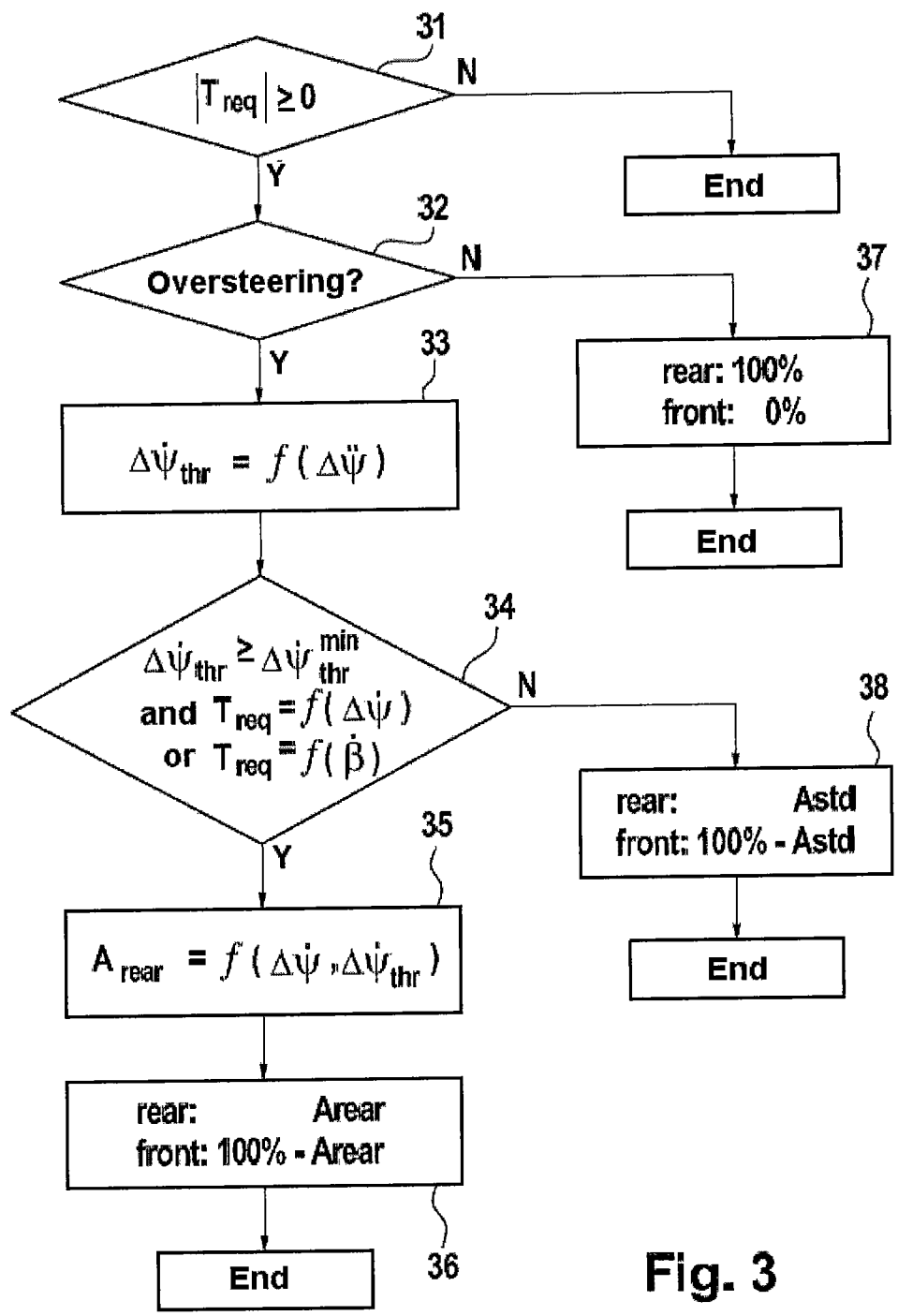
FIG. 3 shows a flowchart for determining the requested braking torque in accordance with an exemplary embodiment of the present invention.

FIG. 3 shows a flowchart for determining the requested braking torques according to an exemplary embodiment of the present invention.

In step 31 it is checked whether the absolute value of the requested braking torque is greater than zero. If this is not the case, no further calculation occurs.

On the basis of the situation detection means present in the driving stability control means (ESC) it is checked in step 32 whether an oversteering situation is occurring. If this is not the case, that is to say an understeering situation is occurring, the requested braking torque is built up to 100% at the rear axle.

For this purpose, in step 33 the threshold value $\Delta\dot{\Psi}_{thr}$ is calculated as a function of the time derivative of the yaw rate difference $\Delta\ddot{\Psi}$. As explained above, a variable distribution of the requested additional torque occurs only for as long as the instantaneous yaw rate difference $\Delta\dot{\Psi}_{mom}$ undershoots this threshold value, in order to avoid the driving stability being put at risk by excessive rear axle braking interventions when there are large yaw rate differences.

If the calculated threshold value $\dot{\Psi}_{thr}$ undershoots a predefined minimum threshold value $\Delta\dot{\Psi}_{thr}^{min}$, the yaw rate difference changes quickly so that excessive rear axle braking interventions could put the driving stability at risk. For this reason, in step 34 it is checked whether $\Delta\dot{\Psi}_{thr} \geq \Delta\dot{\Psi}_{thr}^{min}$ is true. Furthermore, the additional torque must either have been requested by the yaw rate controller ($\Delta\dot{\Psi}$-controller) or the slip angle change controller ($\beta$-controller) of a known yaw moment control means (ESC).

If this is not the case, in step 38 the requested additional torque is distributed between the front and rear axles in accordance with the predefined standard distribution in order to avoid the driving stability being put at risk and/or undesired interactions between the various controllers.

If a variable distribution of the braking torque between the front and rear axles is permissible, this is calculated in step 36 on the basis of the strategy described above.

When the strategy according to aspects of the invention is applied in order to determine a suitable braking torque distribution, in an oversteering situation the additional yaw moment which is to be set is generated as a function of the situation with a variable ratio between the front axle and the rear axle by building up a longitudinal force on one side of the vehicle, wherein in many cases, 100% of the additional yaw moment can be generated by means of the rear axle. As a result, disruptive reactions of the driving stability control are avoided, and in the case of vehicles with an electric brake system or electrically activated brake system at the rear axle it is possible to achieve a gain in comfort by virtue of the fact that braking torque is built up at the rear axle independently of the driver without the disruptive noise of a hydraulic pump.

The invention claimed is:

1. A method in which the driving stability of a vehicle is controlled, wherein a yaw rate difference between a measured actual yaw rate and a setpoint yaw rate is influenced by a yaw moment which is generated at least partially by building up braking torque independently of the driver at one or more wheels, wherein the braking torque influences the yaw moment and is variably apportioned between the front axle and the rear axle of the vehicle in oversteering situations.

2. The method as claimed in claim 1, wherein the portion of the braking torque at the rear axle of the vehicle is selected as a function of the magnitude of the yaw rate difference.

3. The method as claimed in claim 2, wherein a fixed apportionment of the braking torque between the front and rear axles of the vehicle is selected if the yaw rate difference exceeds a predefined first threshold value.

4. The method as claimed in claim 3, wherein braking torque is requested only at the rear axle if the yaw rate difference undershoots a predefined second threshold value.

5. The method as claimed in claim 4, further comprising monitoring the braking torque built up at the rear axle.

6. The method as claimed in claim 5, wherein a braking torque is requested at the front axle if a difference between the requested braking torque at the rear axle and a built-up braking torque at the rear axle exceeds a predefined threshold value.

7. The method as claimed in claim 6, wherein the braking torque at the front axle is selected in accordance with the difference between the requested braking torque at the rear axle and the actually built-up braking torque at the rear axle.

8. The method as claimed in claim 4, wherein the portion of the braking torque which is requested at the rear axle is reduced in proportion to the amount by which the yaw rate difference exceeds the second threshold value.

9. A brake system for a motor vehicle which has hydraulic friction brakes at the wheels of at least one axle, wherein a control unit of the brake system carries out a method as claimed in claim 1.

10. The brake system as claimed in claim 9, wherein the brake system has hydraulic friction brakes at the wheels of the front axle and electromechanical friction brakes at the wheels of the rear axle.

11. The method as claimed in claim 1, wherein a fixed apportionment of the braking torque between the front and rear axles of the vehicle is selected if the change in the yaw rate difference over time exceeds a predefined threshold value.

12. A method in which the driving stability of a vehicle, which has an electric drive at least at wheels of a rear axle, is controlled, wherein a yaw rate difference between a measured actual yaw rate and a setpoint yaw rate is influenced by a yaw moment which is generated at least partially by building up braking torque independently of the driver at one or more wheels, wherein the braking torque influences the yaw moment and is variably apportioned between the front axle and the rear axle of the vehicle in oversteering situations, wherein the torque of the electric drive is distributed separately to the rear wheels, and the braking torque at the rear axle is built up at least partially by the electric drive in a generator mode of the electric drive.

13. The use of a brake system as claimed in claim 12, wherein the electric drive comprises wheel hub motors.

* * * * *